Patented Apr. 3, 1923.

1,450,464

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

CRYSTAL FORMATION.

Application filed July 26, 1920. Serial No. 398,965.

*To all whom it may concern:*

Be it known that I, ELIHU THOMSON, a citizen of the United States, residing at Swampscott, county of Essex, State of Massachusetts, have invented certain new and useful Improvements in Crystal Formations, of which the following is a specification.

The present invention relates to the production of crystals of refractory substances, such for example, as alumina, beryllia or the like.

In accordance with my invention crystals are produced, or grown, from the vapor of the refractory substance and upon a surface maintained slightly below the temperature of the vapor.

Figure 1:
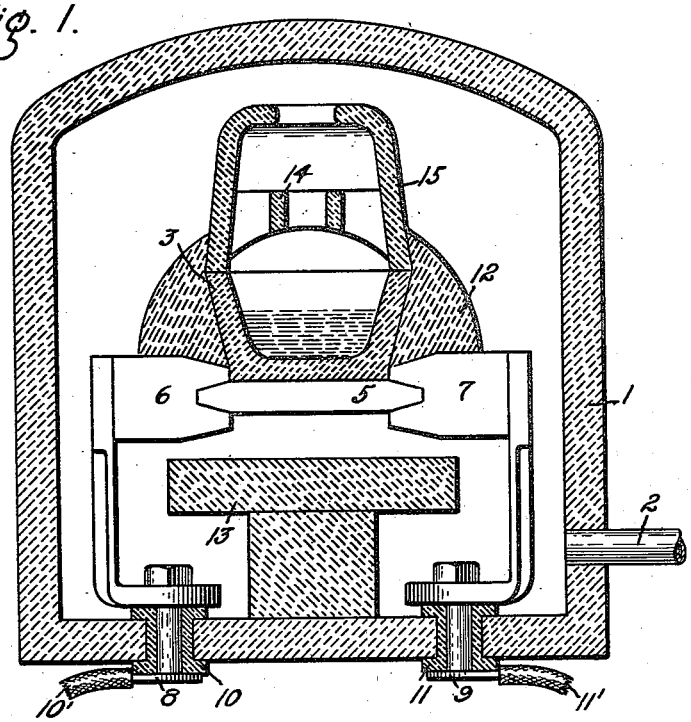
Figure 2:
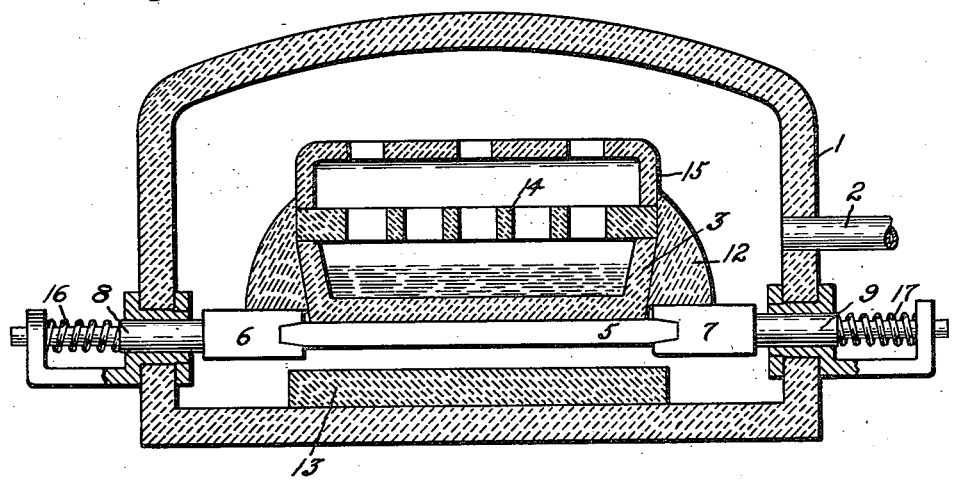

Although my invention is not confined to any particular apparatus, I have illustrated in the accompanying drawing apparatus suitable for carrying out the process constituting my invention. Fig. 1 is a vertical section of one form of apparatus; Fig. 2 a vertical section of a modification, and Fig. 3 a detail plan view of a grid suitable as a condensing surface.

Figure 3:
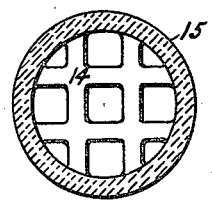

The apparatus shown in Figs. 1 and 2 comprises a container 1 consisting of metal or other suitable material into which is sealed a tube 2 through which the container may be exhausted to a desired vacuum. Within the container 1 is located a crucible 3 consisting of suitable highly refractory material, such, for example, as boron nitride or tungsten. A charge of alumina or the like within the crucible may be heated electrically in any suitable manner, for example by a resistor 5 consisting of graphite, or other suitable refractory material, located adjacent the crucible and supplied with heating current by the conductors 6, 7. Leading-in conductors 8, 9 surrounded by insulating bushings 10, 11, convey current from the supply conductors 10', 11' to the conductors 6, 7. The crucible is surrounded by a refractory jacket 12 to conserve heat. Below the crucible is a pillar or plate 13 of refractory material which constitutes a shield to conserve heat. Just above the heated charge and partly subject to heat radiation outwardly is a refractory grid 14 mounted within an enclosure 15 as shown in Figs. 1 and 3.

The heat input to the apparatus is so regulated that a charge of alumina or the like in the crucible 3 is vaporized. The grid 14 is in such thermal relation to the crucible and the source of heat that the vapor does not condense as a liquid but deposits itself as shining, hard, transparent crystals. Care must be taken not to have the grid too cool and so prevent the deposition of alumina as a powder or fine crystalline grains. The grid should function as a condenser with a restricted range of temperature slightly lower than the temperature at which the vapor and solid phase are in equilibrium at the pressure conditions within the apparatus. Under these conditions a slow conversion of vapor to the solid state and growth of crystals occurs on crystal nuclei on the condensing surface. These crystals constitute a new product, not having been formed from a cooling magma in the presence of water vapor, as in the case of rubies and sapphires. The crystals formed in accordance with my invention do not contain cavities filled with gases under pressure. These crystals have very smooth surface and are more brilliant in appearance than natural crystals. They have sharper angles and appear to be more dense and appear less frequently as elongated prisms than natural crystals. When a sufficient layer, or a sufficient size has been reached by these crystals, the apparatus is dismantled and the crystals are removed.

The apparatus shown in Fig. 2 is substantially the same as the apparatus shown in Fig. 1, differing, however, in size and proportions. The conductors 8, 9 in this device enter through the side walls of the container 1 and are pressed by springs 16, 17, into good electrical contact with the resistor 5.

What I claim as new and desire to secure by Letters Patent of the United States, is,

1. The process of forming crystals of a refractory material which consists in volatilizing said material in an enclosed space, maintaining the temperature and pressure of said vapor in such relation that the solid and vapor phase are substantially in equilibrium, and bringing said vapor into contact with a solid object which is cooler than said vapor but so nearly approaches the temperature of said vapor that a growth of crystals occurs having sharp angles, a smooth surface, and being substantially free from cavities.

2. The process of growing crystals of alumina which consists in volatilizing alumina in an enclosed space and bringing said vapor into contact with a solid surface which is slightly lower in temperature than the equilibrium temperature at which the solid and vapor phase coexist thereby enabling crystal growth to occur on said surface.

3. The process of forming crystals of alumina which consists in volatilizing alumina in an enclosed space, the temperature and pressure of said vapor being maintained to cause a slow conversion of said vapor to the solid state.

4. An apparatus for carrying out the growth of refractory materials comprising a closed container, a refractory crucible therein, means for heating said crucible to a high temperature, a condenser within said crucible out of direct contact with said charge located to assume a temperature at which a slow conversion of vapor of said refractory material to the solid state occurs thereby producing crystal growth on said condenser.

In witness whereof, I have hereunto set my hand this 22nd day of July, 1920.

ELIHU THOMSON.